United States Patent
Wells et al.

(10) Patent No.: US 7,907,665 B2
(45) Date of Patent: Mar. 15, 2011

(54) MULTI-CHANNEL VIDEO COMPRESSION SYSTEM

(75) Inventors: Aaron G. Wells, Oakland, CA (US); Didier LeGall, Los Altos, CA (US)

(73) Assignee: LSI Corporation, Milpitas, CA (US)

( * ) Notice: Subject to any disclaimer, the term of this patent is extended or adjusted under 35 U.S.C. 154(b) by 1492 days.

(21) Appl. No.: 10/389,314

(22) Filed: Mar. 14, 2003

(65) Prior Publication Data

US 2004/0179600 A1    Sep. 16, 2004

(51) Int. Cl.
H04N 7/12 (2006.01)
H04N 11/02 (2006.01)

(52) U.S. Cl. ............................ 375/240.01; 375/240.26

(58) Field of Classification Search .......... 375/240.01–240.07, 240.12–240.16, 375/240.26
See application file for complete search history.

(56) References Cited

U.S. PATENT DOCUMENTS

| | | | | |
|---|---|---|---|---|
| 5,351,129 A * | 9/1994 | Lai | | 348/584 |
| 5,731,850 A * | 3/1998 | Maturi et al. | | 348/699 |
| 5,914,719 A * | 6/1999 | Herz | | 345/418 |
| 6,055,012 A * | 4/2000 | Haskell et al. | | 348/48 |
| 6,275,536 B1 * | 8/2001 | Chen et al. | | 375/240.25 |
| 6,621,434 B2 * | 9/2003 | Barry et al. | | 341/141 |
| 6,661,842 B1 * | 12/2003 | Abousleman | | 375/240.11 |
| 6,704,359 B1 * | 3/2004 | Bayrakeri et al. | | 375/240.12 |
| 6,813,270 B1 * | 11/2004 | Oz et al. | | 370/394 |
| 6,828,967 B1 * | 12/2004 | King et al. | | 345/428 |
| 6,859,496 B1 * | 2/2005 | Boroczky et al. | | 375/240.26 |
| 6,954,499 B2 * | 10/2005 | Sugiyama | | 375/240.13 |
| 7,142,606 B2 * | 11/2006 | Talwalkar et al. | | 375/259 |

\* cited by examiner

*Primary Examiner* — David Czekaj

(74) *Attorney, Agent, or Firm* — Christopher P. Maiorana, PC

(57) ABSTRACT

An apparatus generally comprising an input circuit, a storage circuit and an output circuit is disclosed. The input circuit may be configured to generate a first intermediate signal from a plurality of input video signals. The storage circuit may be configured to (i) organize the first intermediate signal into a plurality of sequences each related to one of the input video signals and (ii) generate a second intermediate signal from the sequences. The output circuit may be configured to generate an output video signal by compressing the second intermediate signal.

17 Claims, 7 Drawing Sheets

MULTI-CHANNEL VIDEO COMPRESSION SYSTEM

FIELD OF THE INVENTION

The present invention relates to video compression generally and, more particularly, to a multi-channel video compression system. In particular, the present invention relates to a video processing and compression/decompression system for handling multiple channels of video for surveillance applications.

BACKGROUND OF THE INVENTION

Conventional surveillance systems use multiple cameras to monitor a site such as a home, office, factory, etc. The systems are often archived to tape or other storage media for future reference. Such surveillance applications need continuous operation and tend to generate large amounts of video data. Storing large volumes of full-motion, full resolution video to tape needs operators, or automated tape (or other media) management systems, to swap tapes frequently as each volume becomes full.

However, using full motion full-resolution video permits the use of commodity devices such as VHS format video cassette recorders rather than more specialized, and more expensive, custom devices. In either case, such a system is not only expensive and failure prone, but also requires transmission of uncompressed video from the site to a central monitoring and archiving station. Video compression provides an improvement over uncompressed video for both transmission and storage.

Additionally, such surveillance normally needs attended monitoring of the acquired video and/or storage of that video for subsequent analysis. Inasmuch as monitoring requires labor, a single operator views the inputs from many cameras simultaneously. For example, four camera images can be displayed on a monitor (i.e., each camera image reduced in size by ½ both horizontally and vertically). While reduced spatial resolution video is often adequate for monitoring, full resolution video is preferable for storage and subsequent analysis. Reducing the video picture rate can provide adequate temporal resolution and reduce the volume of material to archive by a proportional amount. Another method of reducing the amount of material to monitor or store is to switch from camera to camera, displaying each for some period of time. Such time division multiplexing can be used with the spatial decimation to increase the number of inputs simultaneously monitored.

Applying a video encoder to each camera, however, is expensive. A standard video encoder system can process one channel of standard resolution, full motion video, or multiple channels of temporally and/or spatially reduced input. In conventional systems, decimation is done outside the encoder system in an external video multiplexer box by rotating among the inputs, selecting video fields or frames from each, as needed, or by decimation and composition in an external system. The external multiplexer typically also encodes source specific information (such as source camera number and time code) for each field of an output stream. Encoder systems such as DoMiNo™ (a registered trademark of LSI Logic Corporation, headquartered in Milpitas, Calif.) effectively incorporates multiple encoders (i.e., two independent encoders and two independent video inputs in a single integrated circuit and memory subsystem), enabling a further gain in video processing efficiency.

Video compression methods using both spatial as well as motion compensated temporal compression (i.e., MPEG, H.261, H.263, and H.264) are more efficient than spatial-only schemes such as JPEG or "DV" video cassette recorder format. Some current surveillance multiplexers encode information such as the source identifier and current time in the vertical blanking interval (i.e., non-visible pixels) or by overwriting an area of the active video region itself. Furthermore, U.S. Pat. No. 6,229,850, discloses multiple resolution video compression for multi-resolution encoding. The conventional encoding includes I-picture only encoding of a lower resolution and frame rate stream for 'trick mode' (i.e., fast forward or reverse) play as in Digital VHS (DVHS) tape decks. However, DVHS is a single program recording system that does not generate a digest stream. It would be desirable to multiplex inputs from several cameras into a single stream, while reducing and/or eliminating the compression gains of motion compensation.

SUMMARY OF THE INVENTION

The present invention concerns an apparatus generally comprising an input circuit, a storage circuit and an output circuit. The input circuit may be configured to generate a first intermediate signal from a plurality of input video signals. The storage circuit may be configured to (i) organize the first intermediate signal into a plurality of sequences each related to one of the input video signals and (ii) generate a second intermediate signal from the sequences. The output circuit may be configured to generate an output video signal by compressing the second intermediate signal.

The objects, features and advantages of the present invention include providing a video compression system that may (i) provide multi-channel operation utilizing a single video encoder, (ii) generate both high resolution and reduced resolution image sequences from a common source and/or (iii) uses different reference pictures for compression.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
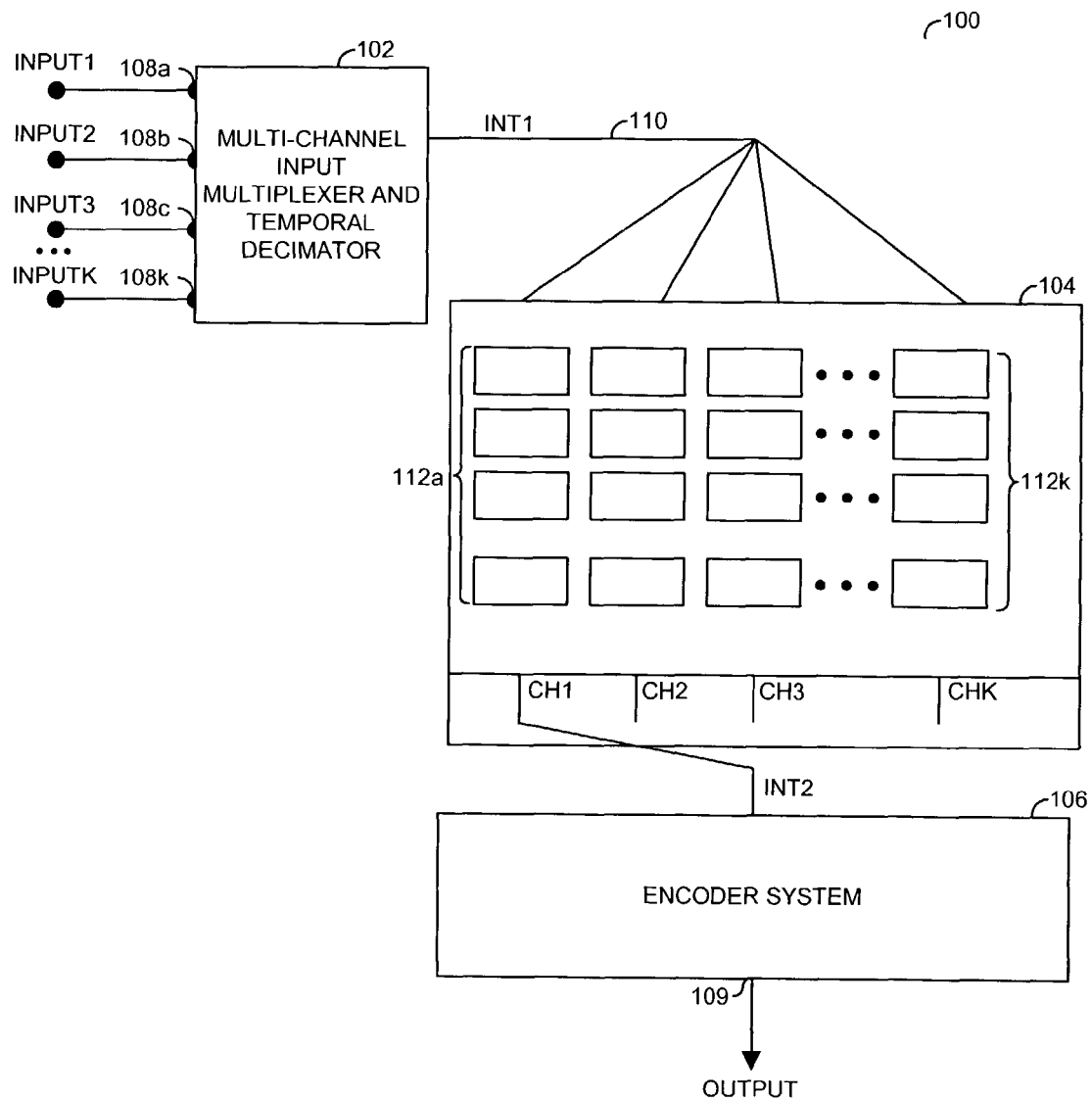
FIG. 1 is a block diagram of a multi-channel encoder system in accordance with a preferred embodiment of the present invention.

Referring to FIG. 1, a diagram of a system 100 illustrating multi-channel encoder system in accordance with a preferred embodiment of the present invention is shown. The system 100 generally comprises an input circuit or section 102, a storage circuit or section 104 and an output circuit or section 106. The system 100 may receive multiple signals (e.g., INPUT1-INPUTk, where k in an integer) at interfaces 108a-108k, respectively. The system 100 may generate a signal (e.g. OUTPUT) at an output 109.

The input section 102 may be implemented as a multichannel input multiplexer and temporal decimator. The input section 102 may implement the inputs 108a-108K. Each of the inputs 108a-108k generally receives one of the input signals INPUT1-INPUTk, sometimes referred to as channels or bitstreams. Each input signal INPUT1-INPUTk may be implemented as a video signal. The input video signals INPUT1-INPUTk may each have a similar video format or have different video formats. The input section 102 may multiplex the input video signals INPUT1-INPUTk at inputs 108a-108k onto a video line 110 as an intermediate signal (e.g., INT1). The intermediate signal INT1 may be implemented in a standard video format.

Multiplexing operations within the input section 102 may be provided by a variety of methods. For example, the input section 102 may multiplex one picture or frame from each of the input video signals INPUT1-INPUTk into the intermediate signal INT1 in rotating turns. In one embodiment, the input section 102 may time multiplex multiple fields, frames and/or groups of pictures from each input video signal INPUT1-INPUTk equally into the intermediate signal INT1. In still another embodiment, a number and/or rate at which information from each input video signal INPUT1-INPUTk is multiplexed into the intermediate signal INT1 may vary from input to input and/or over time. Other multiplexing methods may be provided to meet the criteria of a particular application.

The input section 102 may be operational to decimation of one or more of the input video signal INPUT1-INPUTk prior to multiplexing. For example, every Kth picture may be taken from each of the input video signals INPUT1-INPUTk to assemble the intermediate signal INT1. Sampling rates among the channels may also be varied. In an example four-channel system 100, every-other (½) of the pictures from a first input video signal INPUT1 may be multiplexed, every fourth picture from a second input video signal INPTU2 may be multiplexed, and every eighth picture from a third input video signal INPUT3 and a fourth input video signals INPUT4 may be multiplexed. Additionally, the horizontal resolution (e.g., spatial decimation) ratio for each input video signal INPTU1-INPUTk may be set differently. In the above example, the system 100 may capture and/or transfer the first input video signal INPUT1 at a 720×480 (horizontal by vertical) resolution, the second input video signal INPUT2 at a 704×480 resolution, the third input video signal INPUT3 at a 352×480 resolution, and a fourth input video signal INPUT4 at a 352×240 resolution.

The storage section 104 may be implemented as a memory device. For example, the storage section 104 may be implemented as a computer hard disk drive, a memory device, or other appropriate memory. The memory section 104 may be configured to organize pictures received via the intermediate signal INT1 into separate sequences 112a-112k (where k is an integer), one sequence for each of the input channel video signals INPUT1-INPUTk. The storage section 104 may generate an intermediate signal (e.g., INT2). The intermediate signal INT2 may incorporate picture data from each of the sequences 112a-112k. The intermediate signal INT2 may be implemented in a standard video format suitable for compression by the output section 106.

A storage capacity for each sequence 112a-112k may be based upon one or more parameters associated with the respective input video signal INPUT1-INPUTk. For example, similar memory space may be allocated to buffer each of the sequences 112a-112k where each of the input video signals INPUT1-INPUTk have similar resolutions, frame rates, and priorities. In another example, larger storage capacity may be allocated to a particular channel where the associated input video signal INPUT has a higher resolution, higher frame rate and/or higher priority than the other input video signals INPUT1-INPUTk.

The output section 106 may be implemented as an encoder configured to encode and/or compress a set of pictures (e.g., an MPEG2 group of pictures (GOP)) from each of the sequences 112a-112k within the intermediate signal INT2. The resulting encoded and/or compressed signal may be presented as the output video signal OUTPUT. The output section 106 may be operational to encode/compress the sequences 112a-112k in a rotating pattern. For example, the output section 106 may compress some or all of the first sequence 112a, then some or all of the second sequence 112b, then some or all of the third sequence 112c, and so on. After operating on the final sequence 112k, the output section 106 may wrap around and operate on the first section 112a. Other orderings for encoding/compression may be implemented to meet the criteria of a particular application.

In one embodiment, the output section 106 may group pictures within a particular sequence 112 separately from all the pictures in all other sequences 112a-112k. The pictures within each of the sequences 112a-112k may thus be compressed with references only to other pictures in the same sequence 112a-112k. Illustratively, an output section 106 implementing an MPEG2 encoder may compress the pictures from each input video signal INPUT1-INPUTk as separate closed groups of pictures. Therefore, long periods of low or no-motion video may be captured and motion compensated compression schemes (e.g., MPEG1, MPEG2, MPEG4, H.261, H.263, H.264, etc.) may be applied to achieve extremely efficient compressions. In the above example, the output section 106 may have groups of pictures of different lengths or structure depending on the temporal decimation ratio and/or other application criteria.

Figure 2:
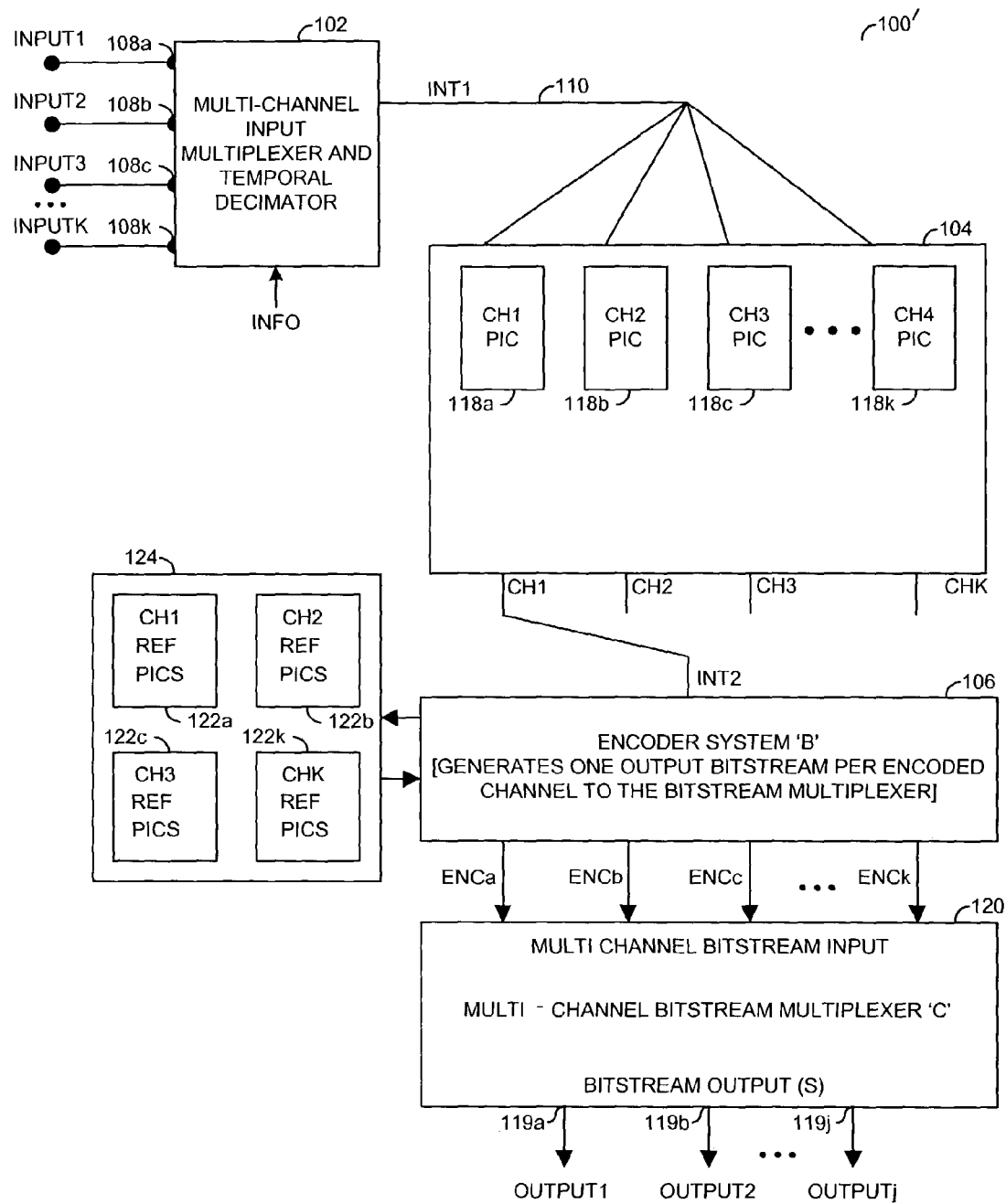
FIG. 2 is a more detailed diagram of a multi-channel encoder with a reduced memory capacity.

Referring to FIG. 2, a diagram of a system 100' illustrating a multi-channel encoder with a reduced memory capacity is shown. For the system 100', the encoder 106 generally maintains separate contexts for the pictures 118a-k of each input video signal INPUT1-INPUTk being encoded. In particular, separate sequences of reference pictures 122a-122k, buffer occupancy models (not shown), and/or other state information (now shown) may be maintained in a memory 124 for each set of pictures 118a-118k. For an application where only intra-frame coded pictures (I-pictures) of a given input video signal INPUT1-INPUTk may be present, the reference pictures 122a-122n may be eliminated.

The output section 106 may encode each picture 118a-118k received via the intermediate signal INT2 as quickly as practical to minimize the memory space used for buffering uncompressed pictures 118a-118k while encoding long groups of picture. Effectively, the output section 106 may generate a separate encoded output signal (e.g., ENCa-ENCk, where k is an integer) for each of the channels. The encoding may be performed substantially concurrently and in parallel for all of the channels. The signals ENCa-ENCk may be optionally multiplexed by a multiplexer 120 to generate one or more output bitstreams (e.g., OUTPUT1-OUTPUTj, where j is an integer) at outputs 119a-119j. The multiplexer 120 may be addressable such that the bitstream or data of each of the input video signal INPUT1-INPUTk may appear in more than one of the output signals OUTPUT1-OUTPUTj.

In one embodiment of the system 100', one of the output signals ENCa-ENCk may be generated to contain conventional picture-in-picture (PIP) type resolution video streams for normal "digest" viewing of multiple cameras. The one output signal ENC may be multiplexed to one of the output video signals OUTPUT1-OUTPUTj for viewing on a single monitor screen (see FIG. 7 152). The multiplexer 120 may also multiplex the one output signal ENC to a second output video signal OUTPUT1-OUTPUTj for transmission to a storage system (see FIG. 7 150) for archiving and subsequent retrieval.

The output section 106 may allow for "seamless splicing" by controlling buffer occupancy at specified locations in each output signal ENCa-ENCk. The bitstream multiplexer 120 may contain intelligence to splice the various signals ENCa-ENCk together as intended. The intelligence of the multiplexer 120 may be well understood in the industry and may includes techniques such as frame dropping, requantization, and padding insertion or removal.

Figure 3A:
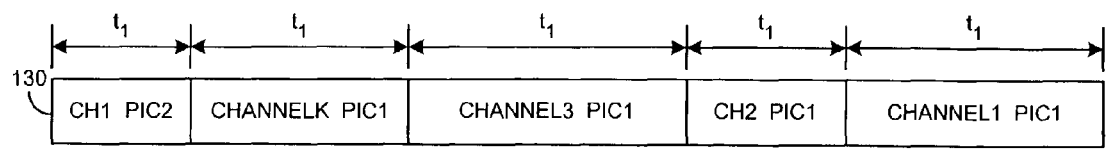
FIGS. 3A-3C are diagrams illustrating a number of bitstreams.
Figure 3B:
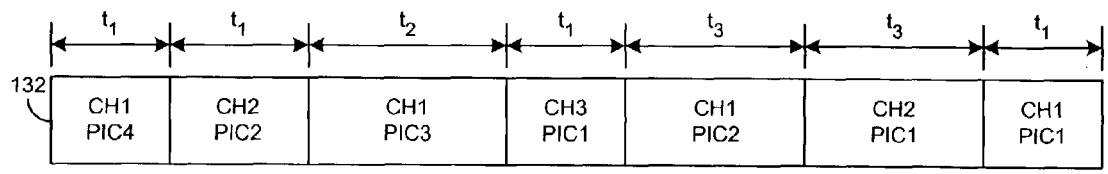
Figure 3C:
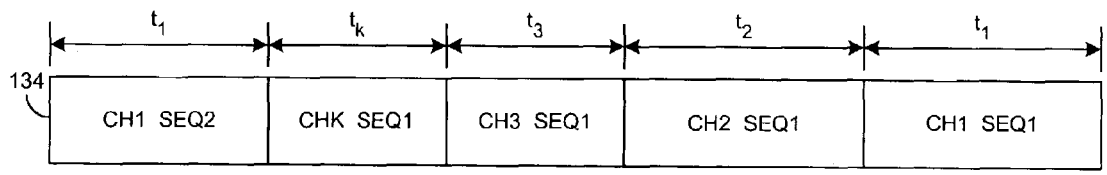

Referring to FIGS. 3A, 3B and 3C, examples of a number of output bitstream variations are shown. FIG. 3A generally illustrates a picture-interleaved bitstream 130 with uniform picture rate. FIG. 3B illustrates a picture interleaved bitstream 132 with a non-uniform picture rate. FIG. 3C illustrates an image sequence (e.g., GOP or MPEG Sequence) interleaved bitstream 134.

Figure 4:
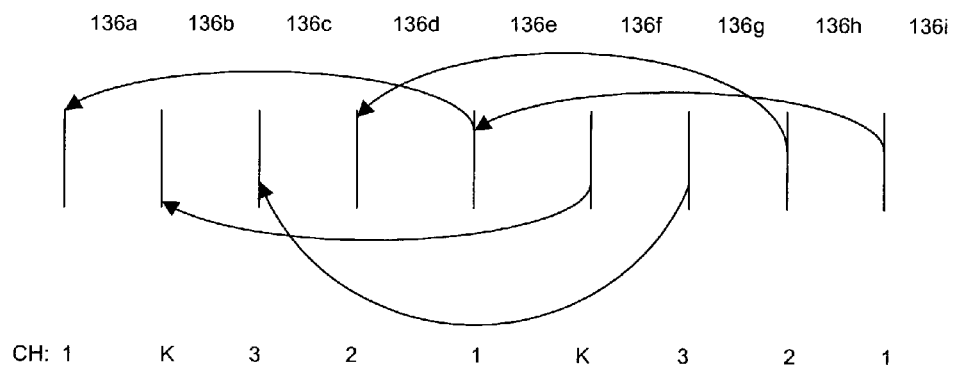
FIG. 4 is a diagram illustrating motion prediction within a bitstream of FIG. 3A or 3B.

In FIG. 3A, the input section 102 may generate the intermediate signal INT1 by interleaving data in the signals INPUT1-INPUTk from the various channels on a picture-by-picture basis. As shown in FIG. 4, each picture 136a-136i may be compressed using reference pictures from that same channel (e.g., picture 136h from the second channel input video signal INPUT2 may be compressed using the reference picture 136d also from the second channel input video signal INPUT2), not the most recent reference picture within the intermediate signal INT1 itself (e.g., the reference picture 136e from the first channel input video signal INPUT1). For simplicity, the picture rate on each channel may be uniform (e.g., t1) and only unidirectional prediction is generally shown, although bi-directional prediction may easily be supported as well.

In FIG. 3B, a non-uniform interleaving rate is illustrated. Each picture within each channel may be provided with a different bandwidth (e.g., periods t1, t2, t3, etc.) generally dependent on the amount of information in the picture. Therefore, the interleaving rate may be varied among different pictures in the same channel and/or among different pictures in different channels.

In FIG. 3C, groups of pictures from each channel may be interleaved instead of individual pictures. A size of each group of pictures may vary among the channels. Therefore, the interleave rate may also vary among the channels.

Referring to FIGS. 2 and 4, the output section 106 receives some information as to which channel the current picture 136a-136i belongs. Information such as the source of the video signals INPUT1-INPUTk and/or time information may be provided to the input section 102 as one or more signals (e.g., INFO) or generated internal to the input section 102. The information may be embedded in various standard structures within the standard intermediate signal INT1 format (e.g., an MPEG stream), such as within the individual pictures 136, a group of pictures 136, sequence user data in an elementary stream layer of the intermediate signal INT1, and/or packetized elementary stream (PES) headers.

In one embodiment, the information may be contained in the pixels encoded in the picture itself. For example, the source information and current time may be embedded in non-viewable vertical blanking intervals, possibly as closed caption data. In another example, the information may be entered in an active picture area (e.g., by specifying pixels or quantized coefficient data directly) where the information is directly viewable on a monitor. Placement of the source information in viewable pixels may have an advantage of preserving the information intrinsically with the pictures. Therefore, even under conditions that lose other data structures and regardless of compression, transmission, storage and/or decompression, the source information may be recovered as long as the associated picture may be recovered.

The output section 106 may be implemented having encoder rate control and rate allocation among the input video signals INPUT1-INPUTk. The output video signals ENCa-ENCk from the output section 106 to the multiplexer 120 may be generated subject to constraints on the output video signals OUTPUTa-OUTPUTj. The output section 106 may utilize a variable bit rate encoding on each channel and allocate bandwidth to each output signal ENCa-ENCk depending on channel statistics (e.g. image complexity, image resolution, motion, frame rate, priority) such that a total output bandwidth for the output signals ENCa-ENCk, and thus OUTPUT1-OUTPUTj may not be exceeded. In a case of multi-output channel encoding, additional constraints may be incorporated on various subsets of the encoded signals ENCa-ENCk and a rate allocation may be established such that a multiplicity of output video signal OUTPUT1-OUTPUTj bandwidth limitations may be accommodated.

The multi-channel encoder system 100' may ensure that the total data generated over a given span of time may remain within a specified amount. By way of an example application, a user may plan to store one week of surveillance video onto a disk or tape of a given size. To efficiently utilize the capacity of the disk or tape, the compression may be varied over time to account for dynamic conditions of the input video signals INPUT1-INPUTk. For instance, parking lot surveillance may have long periods of highly compressible video consuming minimal storage space. Therefore, storage capacity may be saved for expenditure during relatively infrequent periods of complex motion.

Figure 7:
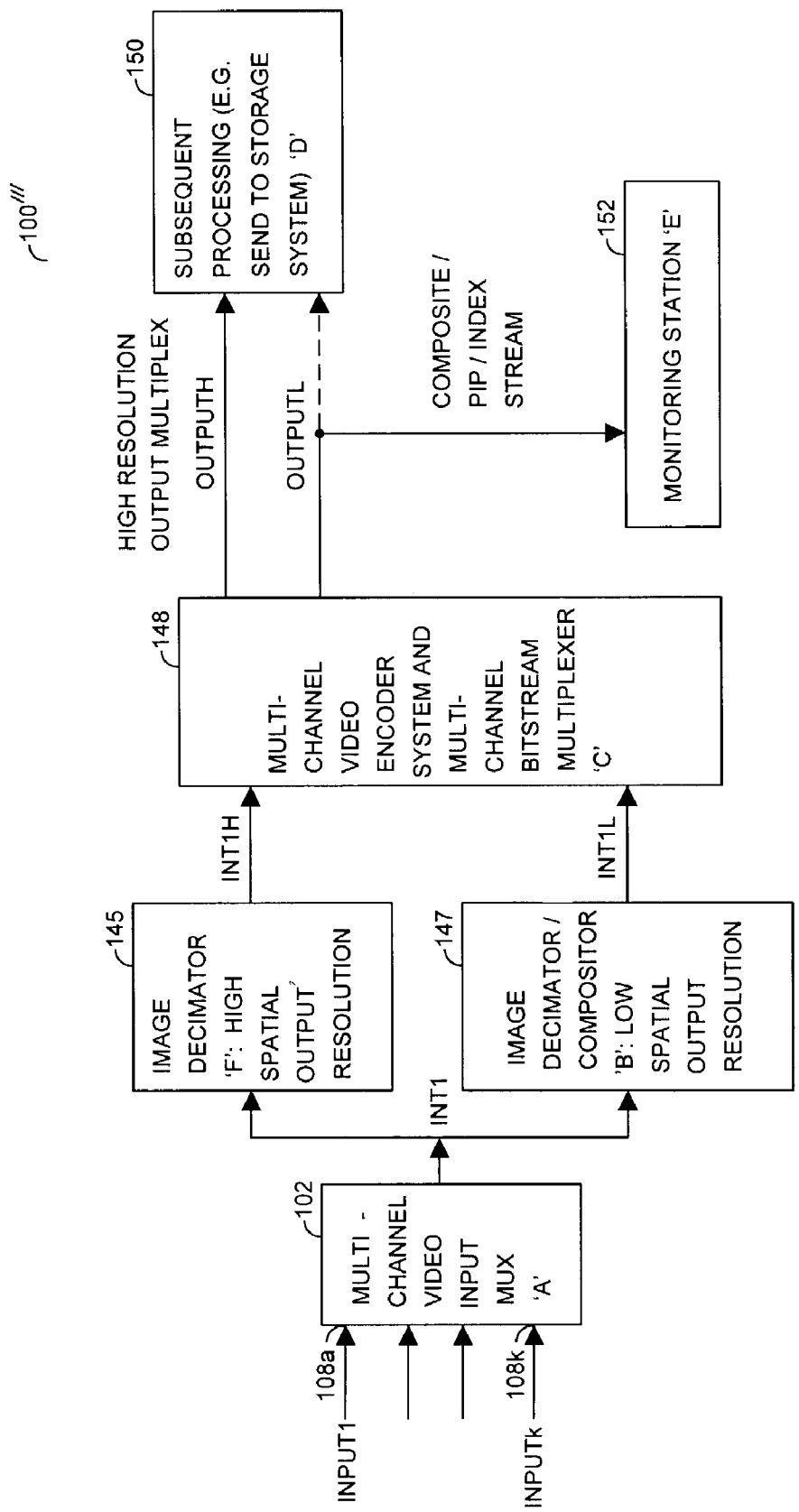
FIG. 7 is a diagram of a multi-stream surveillance system with support for heterogenous processing of separate stream for monitoring and archive.

In another application, one or more of the output video signals OUTPUT1-OUTPUTj may be actively monitored by display of I-pictures from each input video signal INPUT1-INPUTk at a central station (see FIG. 7 152). Minimizing image capture-to-attendant viewing latency may be important to the attendant. Latency reduction may be accomplished by distributing the I-pictures in each channel across the I-picture update period to reduce processing bottlenecks that may be caused by processing multiple I-pictures in a short time.

Figure 5:
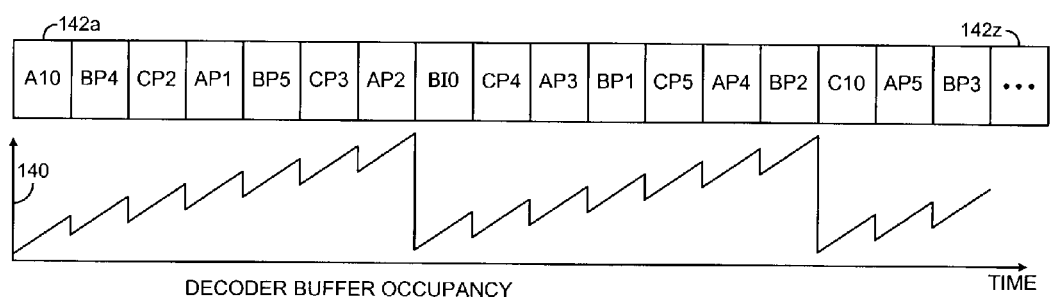
FIG. 5 is a diagram illustrating a three-stream multiplexer with intra-pictures offset.

Referring to FIG. 5 a three-channel system is illustrated where each channel may have an identical frame rate. As an example, each channel (e.g., Axy, Bxy and Cxy, where x is I or P, and y is a picture number) may have a six-picture GOP, I-picture encoding and predicted-picture (P-picture) encoding. An occupancy 140 of a decoder buffer (not shown) is generally illustrated along with displayed pictures 142a-z. Because the I-pictures may be significantly larger than the P-pictures, the decoder buffer occupancy 140, and thus the decoder buffer latency may be brought down to near zero if the I-pictures may be reasonably distributed in time.

Figure 6:
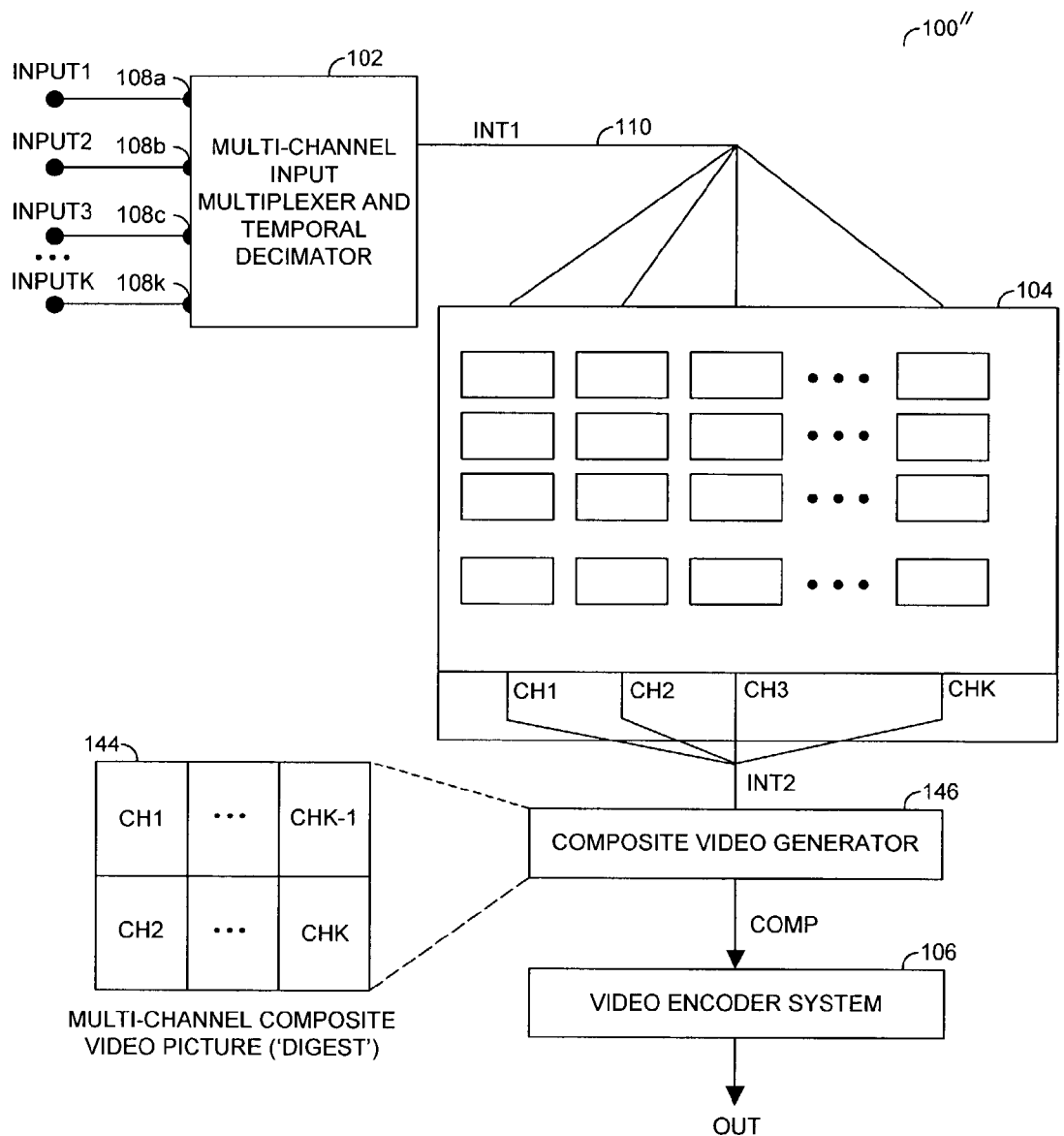
FIG. 6 is a diagram of a multi-channel video composite video channel generator system.

Consider a case where a composite display of multiple channels, for example an image 144 as shown in FIG. 6, may be provided to an attendant (not shown). The decoder system may demultiplex and decode the I-pictures only, updating the appropriate region of the composite image 144 with minimal delay. Extending the above scenario to heterogeneous frame rates and more complex encoding structures is generally straightforward.

The various input channels may be running from independent clocks. Providing a frame synchronization and time base correction function across the channels within the storage section 104 may effectively lock the input video signals INPUT1-INPUTk to a single clock at the intermediate signal INT2. Locking to a single clock may simplify decoder display functions (e.g., for composite frame generation).

Referring to FIG. 6, a system 100" illustrating a multi-channel video composite video channel generation is shown. The system 100" may be similar to the systems 100 and 100' with the addition of a circuit or section 146. The section 146 may be implemented as a composite video generator section. The composite video generator section 146 may be disposed between the storage section 104 and the output section 106. The system 100" generally processes one or more input channels having two or more spatial and/or temporal resolutions. Schematically, the system 100" may be combined with the system 100 of FIG. 1 and/or the system 100' of FIG. 2.

The composite video generator section 146 may be operational to generate a multi-channel "digest" video signal (e.g., COMP) The digest video signal COMP may convey a stream of digest pictures 144. Each digest picture 144 may include a decimated picture from each sequence 112a-112k, not yet spatially decimated to fit within the digest picture 144. The video signal COMP may be provided to the output section 106 as another intermediate signal.

When used with a multiplexer 120 (see FIG. 2), the encoded digest video signal (e.g., OUT) may be provided to the multiplexer 120 as of one of the encoded output signals. The multiplexer 120 may then multiplex the encoded digest video signal OUT to one or more of the output video signals OUTPUT1-OUTPUTj.

Referring to FIG. 7, a system 100''' illustrating a multi-stream, surveillance system with support for heterogeneous processing of separate streams for monitoring and archiving is shown. The system 100''' generally comprises the input section 102, a decimator circuit or section 145, a decimator/compositor circuit or section 147, an encoder circuit or section 148, a processing circuit or section 150 and a monitoring station or display circuit 152. The encoder section 148 generally comprises the storage section 104, the output section 106 and the multiplexer 120 as shown in FIG. 2 with the storage section 104 adapted to receive two intermediate signals INT1H and INT1L substantially simultaneously.

The intermediate signal INT1 may be received by both the decimator section 145 and the decimator/compositor section 147. The decimator section 145 may be operational to generate a signal (e.g., INT1H) from the intermediate signal INT1. The signal INT1H may be a high spatial output resolution video signal. The decimator/compositor section 147 may be operational to generate a signal (e.g., INT1L) from the intermediate signal INT1. The signal INT1L may be a low spatial output resolution video signal, relative to the signal INT1H. The signal INT1L may be a time-multiplex stream of each input video signal INPUT1-INPUTk. The signal INT1L may include a composite, picture-in-picture, index and/or similar stream having decimated pictures from several of the input video signals INPUT1-INPUTk.

Generation of the high-resolution signal INT1H may involve horizontal decimation, vertical decimation, temporal decimation, or no decimation at all. Similarly, generation of the low resolution signal INT1L may be achieved using any of the above decimation methods. The low resolution signal INT1L may also be a digest of lower resolution pictures from the other input video signals INPUT1-INPUTk. In one embodiment, several input video signals INPUT may be (i) decimated by ½ both horizontally and vertically, generating source input format (SIF) pictures and (ii) further decimated temporally to generate updated pictures on the order of once per second. The decimator section 145 may insert one or more still frames at a non-decimated and/or higher resolution into the high-resolution signal INT1H.

The encoder section 148 may be configured to receive, buffer, encode and multiplex each of the intermediate signals INT1H and INT1L. The multiplexer 120 within the encoder section 148 may generate multiple output video signals (e.g., OUTPUTH and OUTPUTL) from the encoded versions of the intermediate signals INT1H and INT1L, respectively. The output video signal OUTPUTH may have a spatial and/or temporal resolution higher than that of the output video signal OUTPUTL. The encoder section 148 is shown generating two output video signals OUTPUTH and OUTPUTL for diagrammatic simplicity, although (as shown in FIG. 2) a higher number of output video signals may be generated.

The output video signals OUTPUTH and OUTPUTL may be sent to different locations for further processing. In one embodiment, the output video signal OUTPUTH may be transferred to the processing section 150. The processing section 150 may be configured to perform additional operations on the output video signal OUTPUTH before forwarding to a subsequent section. For example, the subsequent section may be a storage system for archiving the high resolution output video signal OUTPUTH permitting later retrieval and analysis.

The output video signal OUTPUTL may be transferred to the monitoring station 152 for real-time viewing. The output video signal OUTPUTL may optionally be transferred to the processing section 150 (as indicated by the dashed arrow). Archiving the signal OUTPUTL may provide a way to quickly identify a reference time that a particular event was captured by one or more of the cameras. The reference time may then provide a starting point for viewing the appropriate high-resolution picture or pictures.

Figure 8:
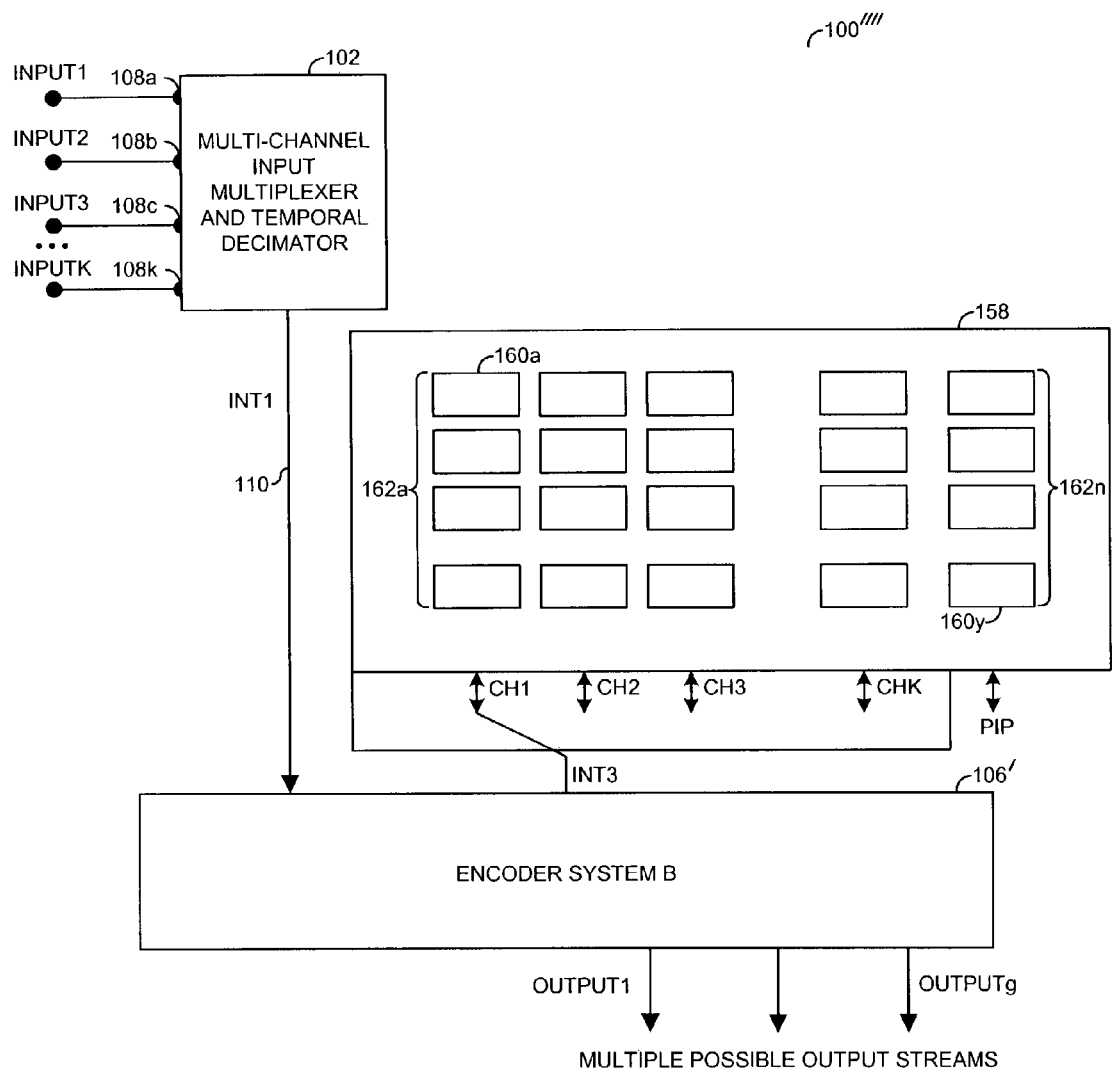
FIG. 8 is a diagram illustrating a multi-channel encoder system with multiple output streams.

Referring to FIG. 8, a system 100"" illustrating a multi-channel encoder system with a multiple possible output streams reference image set selection is shown. The system 100"" may direct the intermediate signal INT1 generated by the input section 102 directly to an output section 106'. A storage circuit or section 158 may store multiple reference pictures 160a-160y for use in encoding the input video signals INPUT1-INPUTk. Each input video signal INPUT1-INPUTk may be associated with one or more of the reference pictures 160a-160y.

The K inputs 108a-108k may be multiplexed into the intermediate signal INT1 on a standard video line 110 by the input section 102. The storage section 158 generally organizes sets of the reference pictures 160 from each channel into separate sequences 162a-162m. One or more reference picture sequences 162a-162n may include reference pictures 160 for composite, PIP, or other modified video signals. The encoder section 106' may encode pictures from the various inputs video signals INPUT1-INPUTk by accessing an appropriate set of reference pictures 160 for each picture received within an intermediate signal (e.g., INT3). The encoder section 106' generally encodes input pictures in an arrival order and generates a one or more output video signals OUTPUT1-OUTPUTg.

Encoding the pictures within the signal INT1 in the arrival order may allow the image storage system 104 of FIG. 2 to be eliminated. Per the H.264 video standard, the pictures from the various input video signals INPUT1-INPUTk may be encoded in a receive order and presented concurrently in the output video signals OUTPUT1-OUTPUTg.

Specific features of different encoding standards, such as H.264, may be used in encoding/compressing the pictures. In the H.264 standard, multiple reference pictures may be stored both by the encoder storage section 158 and a similar decoder storage section (not shown). In the compression process, the encoder output section 106' may determine which particular reference pictures 160 to use for the current picture and signal the particular reference picture 160 in the output video signals OUTPUT1-OUTPUTg. The intended usage of the reference pictures 160*a*-160*y* is generally for teleconferencing where a static background may be available most of the time. Therefore, the static background may only be transmitted once or infrequently sent to the decoder for permanent storage. The reference pictures 160*a*-160*y* may be applied to the multichannel surveillance encoder output section 106' for each video channel to be encoded. A particular reference picture 160 for a channel selected for a picture may be the same particular reference picture 160 used previously for that channel.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    an input circuit configured to (i) generate a first intermediate signal by multiplexing a plurality of input video signals, each of said input video signal being received through a different one of a plurality of channels and (ii) temporally decimate at least two of said input video signals using different time ratios on each of said at least two of said input video signals, said time ratios being based on different priorities of said channels;
    a storage circuit configured to (i) parse said first intermediate signal into a plurality of sequences, each of said sequences corresponds to a different one of said input video signals, (ii) store said sequences in a plurality of buffers, each of said buffers storing in a different one of said sequences and (iii) generate a second intermediate signal by time multiplexing said sequences from said buffers; and
    an output circuit configured to generate an output video signal by compressing a portion of each of said sequences in said second intermediate signal in a rotating pattern, each of said portions comprising a group of pictures.

2. The apparatus according to claim 1, wherein said input circuit is further configured to:
    generate said first intermediate signal by temporally decimating at least one of said input video signals.

3. The apparatus according to claim 1, wherein said input circuit is further configured to:
    spatially decimate at least two of said input video signals using different spatial resolutions on each of said at least two of said input video signals.

4. The apparatus according to claim 1, wherein said output circuit is further configured to:
    generate said output video signal by (i) generating a plurality of intermediate sequences by encoding each of said portions separately using a motion-compensated compression and (ii) concatenating said intermediate sequences after said encoding.

5. The apparatus according to claim 1, wherein said output circuit is further configured to:
    generate said output video signal by (i) generating a plurality of intermediate sequences by encoding each of said portions in turn and (ii) interleaving said intermediate sequences after said encoding.

6. The apparatus according to claim 5, wherein said output circuit is further configured to:
    generate said intermediate sequences such that (i) a plurality of first intra-frame coded pictures of a first of said intermediate sequences are temporally spaced from each other by an intra-frame update period within said output video signal and (ii) a plurality of second intra-frame coded pictures of a second of said intermediate sequences are (a) temporally spaced from each other by said intra-frame update period and (b) temporally spaced from said first intra-frame coded pictures by said intra-frame update period within said output video signal.

7. The apparatus according to claim 1, wherein said input circuit is further configured to:
    add a unique identifier to at least one of said input video signals.

8. The apparatus according to claim 7, wherein said unique identifier is disposed within an active picture area and outside a video blanking area of said at least one of said input video signals.

9. The apparatus according to claim 7, wherein said output circuit is further configured to:
    read said unique identifier from said at least one of said input video signals.

10. The apparatus according to claim 9, wherein said output circuit is further configured to:
    add said unique identifier to said output video signal independent of a plurality of pictures for said at least one input video signal.

11. The apparatus according to claim 1, wherein said input circuit is further configured to:
    add a unique identifier to said first intermediate signal identifying at least one of said input video signals.

12. The apparatus according to claim 1, wherein said input circuit is further configured to:
    generate a unique identifier for at least one of said input video signals in one range of a decode time stamp range and a presentation time stamp range.

13. The apparatus according to claim 1, wherein said output circuit is further configured to:
    maintain a single context for said input video signals; and
    encode said sequences in a bitstream order.

14. The apparatus according to claim 1, wherein said storage circuit is further configured to synchronize in said second intermediate signal a plurality of pictures of said input video signals while said input video signals are running from a plurality of independent clocks respectively.

15. An apparatus comprising:
    an input circuit configured to (i) generate an intermediate signal by time multiplexing a plurality of input video signals, each of said input video signals being received in a different one of a plurality of channels and (ii) temporally decimate at least two of said input video signals using different time ratios on each of said at least two of said input video signals, said time ratios being based on different priorities of said channels;

a storage circuit configured to (i) simultaneously store at least one reference picture for each of said channels and (ii) arrange said reference pictures into a plurality of sets, one of said sets per each of said channels; and an output circuit configured to (i) generate said reference pictures, (ii) exchange said reference pictures with said storage circuit and (iii) generate an output video signal by compressing a portion of each of said input video signals in said intermediate signal in a rotating pattern using said reference pictures, each of said portions comprising a group of pictures.

16. The apparatus according to claim 15, wherein said reference pictures created from a particular one of said input video signals are used exclusively to compress a plurality of pictures originating in said particular input video signal.

17. The apparatus according to claim 15, wherein said output circuit is further configured to:

maintain a single context for said input video signals; and encode said input video signals in a bitstream order.

* * * * *